United States Patent Office 3,767,657
Patented Oct. 23, 1973

3,767,657
PROCESS FOR THE PREPARATION OF
QUINOXALINE-DI-N-OXIDES
Robert L. Robertson, Waterford, and Robert V. Kasubick, Gales Ferry, Conn., assignors to Pfizer Inc., New York, N.Y.
No Drawing. Filed Mar. 31, 1971, Ser. No. 129,979
Int. Cl. C07d 51/78
U.S. Cl. 260—250 R                 5 Claims

ABSTRACT OF THE DISCLOSURE

Improved synthesis of esters of 2-quinoxalinecarboxylic acid-1,4-dioxides through a condensation of a benzofuroxan and β-ketoester in the presence of a catalytic amount of calcium hydroxide, at a temperature of 40–80° C.

BACKGROUND OF THE INVENTION

This invention relates to an improved process for the preparation of esters of quinoxaline-2-carboxylic acid, 1,4-dioxide which comprises condensation of a benzofuroxan with a β-ketoester in the presence of a base catalyst, calcium hydroxide, the products of which are useful as antibacterial agents or as intermediates leading to compounds having activity against pathogenic microorganisms.

Continuing synthetic efforts to discover new and more useful antibacterial agents have led, over the years, to the development of a variety of prototype organic compounds including numerous analogs of quinoxaline-1,4-dioxides. Landquist et al., J. Chem. Soc., 2052 (1956), in a search for compounds of improved antibacterial and antiprotozoal activity, reported the preparation of several derivatives of 2 - methyl- and 2,3-dimethylquinoxaline-1,4-dioxides using the procedure of Wegmann et al., Helv. Chim. Acta., 29, 95 (1946) which comprised condensation of a 1,2-dione with o-phenylenediamine followed by peracid oxidation of the quinoxaline to the di-N-oxide. More recently, Haddadin et al., Tetrahedron Letters, 3253 (1965), demonstrated the synthesis of quinoxaline-di-N-oxides in a single step reaction utilizing a benzofuroxan and an enamine. This same group was also successful in condensing benzofuroxans with certain 1,3-diketones and β-ketoesters, including ethyl acetoacetate, in the presence of a basic catalyst to yield quinoxaline - 1,4-dioxides, J. Org. Chem., 31, 4067 (1966). Ley et al., Agnew Chem. Internat. Edit., 8, 596 (1969), have corroborated the synthesis of quinoxaline-di-N-oxides from ketones and benzofuroxanes and have shown that this latter reagent can be reacted in the presence of ammonia with phenols and quinone derivatives to provide phenazine-di-N-oxide analogs.

SUMMARY OF THE INVENTION

It has now been discovered that in the process for preparing esters of 2-quinoxalinecarboxylic acid, 1,4-dioxides, a class of compounds useful as anti-bacterial agents and as intermediates leading to other compounds having activity against pathogenic microorganisms, by reacting a benzofuroxan of the formula:

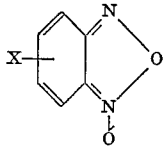

wherein X is a substituent at the 5- or 6-position selected from the group consisting of hydrogen, fluorine, chlorine, bromine, trifluoromethyl, methyl and methoxy, with a β-ketoester of the formula:

CH₃COCH₂CO₂R wherein R is alkyl containing from 1 to 4 carbon atoms or alkanoyloxyalkyl wherein said alkyl contains from 2 to 4 carbon atoms and said alkanoyloxy contains from 1 to 4 carbon atoms, the use of a catalytic amount of calcium hydroxide at 40–80° C. results in a marked improvement in the yield and purity of the desired product. Previously reported base condensation reactions utilizing the aforedescribed starting reagents employ large quantities of the base which results in low yields. This is especially the case wherein the base is a tertiary amine, resulting in extensive N-oxide exchange and poor product quality.

Also included within the purview of the present process invention is the calcium hydroxide catalyzed reaction of a benzofuroxan with a compound having an activated methylene group, said compound being selected from the group consisting of a first division wherein the methylene group is activated by being linked to two electron-withdrawing groups at least one of which contains a carbon atom α- to the methylene group, e.g., a malonic acid diester, a malonamate, a malonic acid diamine, a cyanoacetamide, a cyanoacetate, a β-diketone and malonitrile, and a second division wherein the methylene group is activated by being linked to an electron-withdrawing group consisting of a carbonyl group of a ketone or aldehyde, e.g., an aldehyde, an alicyclic ketone, a non-cyclic ketone, an acetal of pyruvaldehyde and a heterocyclic ketone. Also considered within the scope of the present invention is the use of other alkali-earth metal hydroxides in the aforedescribed condensations.

Of particular interest in the process of the present invention is the calcium hydroxide catalyzed reaction of benzofuroxan with acetoacetic acid esters wherein the previously indicated variable, R, is methyl, ethyl and 2-acetoxyethyl.

DETAILED DESCRIPTION OF THE INVENTION

The aforedescribed reaction is depicted in the following scheme:

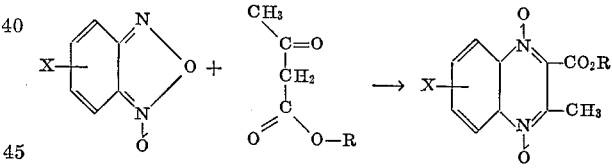

wherein X and R are as previously indicated.

Quinoxaline-di-N-oxides of the instant process invention result from the condensation of benzofuroxan and substituted benzofuroxans with acetoacetates such that the 2- and 3-positions of the resulting annellated structure represent the carbonyl carbon and the carbon of the active methylene group of the acetoacetate.

The favored positions on the fused benzene ring of said final products are the 6- or 7-positions. The favored positions for substituents on the aryl ring of the starting benzofuroxans leading to said final products are the 5- or 6-positions. When one of said substituted benzofuroxans is condensed with the requisite acetoacetate, a 6- and 7-substituted quinoxaline-di-N-oxide are produced. This multiple product formation results because of the two orientation possibilities of the acetoacetate fragment in the final product. For example, if one reacts a 5-substituted benzofuroxan of the formula:

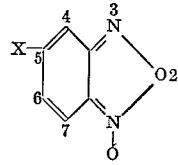

with a reactant $CH_3COCH_2CO_2R$, two products, a 6- and 7-substituted quinoxaline-di-N-oxide, result as shown by the formulae:

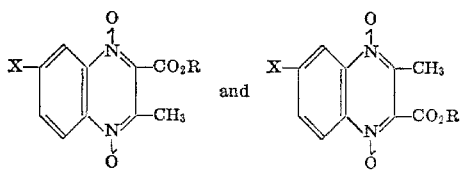

If the corresponding 6-substituted benzofuroxan is employed as the starting material, the same two possible products are formed.

The mixture of isomers is recovered by methods known to those skilled in the art. In many of the preparations disclosed wherein a solid, often crystalline material, separates from the reaction mixture, the solid appears to consist predominantly of one of the isomers. Said isomer can be purified by repeated recrystallization from a suitable solvent to a constant melting point. The other isomer, the one present in smaller amounts in the originally isolated solid material, is the predominant product in the mother liquor. It can be recovered therefrom by methods known to those skilled in the art, as for example, the evaporation of the mother liquor and repeated crystallization of the residue to a product of constant melting point. Alternatively, the reaction mixture can be extracted either before or after evaporation to dryness.

Although said mixtures may be separated by methods known to those skilled in the art, for practical reasons it is advantageous to use said mixtures as they are isolated from the reaction. Further it is frequently advantageous to purify these mixtures of isomers by at least one recrystallization from an appropriate solvent or by trituration in an appropriate solvent. Said recrystallization or trituration thus allows the separation of the mixture of positional isomers from such extraneous materials as starting material and undesirable by-products.

The identification of the isomers has not been completed. Both isomers of a given compound, however, exhibit the same type of activity, e.g., as antibacterial agents.

In the above described reaction for the condensation of acetoacetates with benzofuroxans, the theoretical ratio for said reactant is 1:1. In practice, the reaction is forced to completion by the use of as much as a 50 mole percent excess of the appropriate benzofuroxan or a 25-50 mole percent excess of the requisite acetoacetate. Cost factors favor the employment of excess acetoacetate to facilitate completion of the herein described reaction.

In most instances it is desirable to conduct said reaction in a reaction-inert solvent. By such a solvent is contemplated those which, under the conditions of the instant process, does not enter into appreciable reaction with either the starting reagents or the products. It is preferred that nonaqueous solvents be employed, although a small amount of moisture is tolerable without markedly affecting the yields or purity of the resulting product. Suitable solvents or combinations thereof which are included in this group are chlorinated(lower)alkyl hydrocarbons, N,N - di(lower)alkyl(lower)alkylcarboxamides, (lower) alkanols, (lower)alkylnitriles and liquid aromatic hydrocarbons. In addition to these classes of solvents, the acetoacetate reactant can be employed as a solvent without markedly affecting the course of the reaction. The preferred solvents for the present process are isopropanol and chloroform.

Reaction time is not critical and is inherently dependent on concentration, reaction temperature and reactivity of the starting reagents. In general, when temperatures of 40-80° C. are employed, the reaction time will vary between 2 to 18 hours.

The order in which the reactants are combined do not affect the outcome of the reaction. Experimentally, the benzofuroxan derivative and the acetoacetate are combined in a suitable solvent or mixture of solvents and subsequently treated with the basic catalyst, calcium hydroxide. The heat of the reaction, which has been assessed to be in the order of 35 kcal./mole, can be controlled by adding the calcium hydroxide at such a rate as to provide a reaction temperature which falls within the previously mentioned desirable range of 40-80° C. The preferred rate of addition of the catalyst, calcium hydroxide, is during a time span of 1-2 hours.

As has been previously mentioned, a wide variety of bases have been employed in the condensation reactions of benzofuroxans with various carbonyl containing compounds. In general, a large excess of base is employed in said reactions without, at times, appreciable yields of the desired products. In the present process invention, calcium hydroxide provides higher yields of purer product even when employed in catalytic quantities. By catalytic amounts of calcium hydroxide are contemplated quantities less than an equivalent amount and, further, quantities as small as 2.5 mole percent. A preferred range of 2.5 to 10 mole percent of calcium hydroxide provides a remarkable catalytic effect in the aforedescribed condensation reaction.

As one skilled in the art can readily appreciate, several pro-forms of calcium hydroxide under proper experimental conditions can be employed with similar success. For example, calcium hydride, $CaH_2$, a readily available commercial reagent, when employed as the basic catalyst in the herein described condensation reaction in an aprotic solvent free of any hydroxyl bearing reagents, e.g., water or alcohols, fails to effect any reaction. Addition of small quantities of an alcohol or water, however, results in formation of calcium hydroxide and the reaction proceeds in a normal course. Other pro-forms of calcium hydroxide are contemplatable and include calcium oxide and calcium (lower)alkoxides. Further, the calcium hydroxide employed can be anhydrous or can be associated with water and exist as the mono- or polyhydrate.

Isolation of the products from the herein described process is conveniently carried out by procedures familiar to those skilled in the art. For example, when a solvent is employed in which the product is sparingly soluble, e.g., isopropanol, the reaction mixture is cooled and the precipitate filtered. Further concentration of the filtrate can result in the isolation of some additional product, but usually of poorer quality. In those instances wherein a more polar and solubilizing solvent is used, the product is isolated by diluting said solvent with one having very low solubilizing characteristics, e.g., diisopropyl- or diethyl ether. Further purification of the products can be carried out by recrystallization from appropriate solvents.

The requisite benzofuroxans and acetoacetates employed as starting reagents for the present process invention are either readily available or easily prepared by methods known to those skilled in the art. For instance, the synthesis of variously substituted benzofuroxan is reviewed by Kaufman et al., in Advan. Heterocyclic Chem., 10, 1 (1969). Acetoacetates are readily prepared from diketene and the appropriate alcohol according to the general procedure of Brintzinger et al., Chem. Ber., 83, 103 (1950).

As previously mentioned, the products of the present process invention wherein X is as previously indicated and R is alkanoyloxyalkyl are remarkably effective in treating a wide variety of pathogenic microorganisms. They are, therefore, useful as industrial antimicrobials, for example, in water treatment, slime control, paint and wood preservation as well as for topical application purposes as disinfectants. Products wherein X is as indicated and R is alkyl, in addition to having useful antimicrobial activity, can be transformed, via transesterification, into other useful antibacterials, e.g., transesterification with ethylene glycol.

The preferred embodiment of the present invention relates to the use of the basic catalyst, calcium hydroxide, and pro-forms thereof, in the preparation of the aforementioned quinoxaline-1,4-dioxides wherein X is hydrogen and R is methyl, ethyl or 2-acetoxyethyl.

For in vitro use, e.g., for topical application, it will often be convenient to compound the selected product with a pharmaceutically acceptable carrier such as vegetable or mineral oil or an emollient cream. Similarly, they may be dissolved or dispensed in liquid carriers or solvents such as water, alcohol, glycols or mixtures thereof or other pharmaceutically acceptable inert media, that is, media which have no harmful effect on the active ingredient. For such purposes, it will generally be acceptable to employ concentrations of active ingredients of from about 0.01 percent to about 10 percent by weight based on total composition.

In determining the in vitro activity of the herein described antibiotic, the sensitivity of the various microorganisms is determined by the commonly accepted two fold serial dilution technique. Final concentrations of compound per ml. range from 100 mcg. in the first tube to 0.19 mcg. in the tenth tube. The inoculum consists of 0.5 ml. of a $1 \times 10^{-3}$ dilution of a standardized culture. Final volume in each tube or cup in the DisPoso tray is 1.0 ml. The tubes are incubated at 37° C. for approximately 24 hours. The medium used is Witkins synthetic or Brain Heart Infusion (BHI). The sensitivity (MIC—minimal inhibitory concentration) of the test organism is accepted as evidenced by the absence of gross turbidity.

Further, compounds described herein exhibit broad spectrum activity, that is, activity against both gram-negative and gram-positive bacteria, in contrast to the usual gram-negative activity of quinoxaline-di-N-oxides. Additionally, they are active in vivo.

When used in vivo for such purposes, these novel compounds can be administered orally or parenterally, e.g., by subcutaneous, intramuscular, or intravenous injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are nontoxic in the volume or proportion used (glycerol, propylene glycol, sorbitol and dimethylacetamide). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically acceptable inert carriers including solid diluents, aqueous vehicles, nontoxic organic solvents in the form of capsules, tablets, losenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

The in vivo efficacy of the compounds of the instant invention is determined by the antibacterial activity against acute infections in mice. The acute experimental infections are produced by the intraperitoneal inoculation of standardized culture suspended in either 5% hog gastric mucin or broth. A brief discussion of the words "standardized culture" would seem to be beneficial. In order to obtain reproducible results with a test compound it is necessary to control, as much as possible, the many variables that can enter into this type of test. An organism of high virulence if used in large enough numbers can make almost any drug look inactive. On the other hand, an inoculum not able to produce a measurable difference between treated and untreated groups is equally lacking in purpose.

Stock cultures of test organisms are normally maintained on slants or in liquid medium. When not routinely used they are maintained at refrigerator temperature or in a lyophilized state. When it becomes necessary to use a culture in animal protection tests the culture is suspended in a volume of saline or broth, and the density of the suspension is measured by a photoelectric colorimeter. From this stock, ten-fold dilutions are prepared. Each dilution is inoculated into a series of mice in order to determine the $LD_{100}$, the $LD_{100}$ being the lowest concentration of organisms required to produce 100 percent deaths. For example, if it is found that a dilution of $10^{-4}$ is the lowest level of organism that will produce 100 percent death, an inoculum of $10^{-3}$ would probably be used for the drug evaluation experiments. This means that we are using about 10 $LD_{100}$ or ten times the minimum dose required to kill mice. Such a test would also include the use of control animals which receive an inoculum of $10^{-4}$, $10^{-5}$, and possibly $10^{-6}$. These dilutions are included as a check on possible variation in virulence which can occur. Having previously determined, through the virulence titration, that $10^{-4}$ was the maximum dilution that will kill we naturally expect these animals to die, usually within 24 hours.

Each organism has its own standardized inoculum level. Some, such as Staphylococcus, may be used at $10^{-1}$, while others like Stretococcus require weekly animal passage in order to maintain virulence.

When evaluating an antibotic for its effectiveness after a single dose, the dose is usually administered 0.5 hour after inoculating the mice with the lethal concentration of organisms. In this type of treatment schedule surviving mice are usually held for four days after the treatment and the percent alive is calculated.

The addition of a low level of one or more of the herein described 2-quinoxalinecarboxylic acid, alkanoyloxyalkyl ester, 1,4-dioxides to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats mules rabbits mink etc. The beneficial effects in growth rate and feed efficiency are over and above what is normally obtained with complete nutritious diets containing all the nutrients, vitamins, minerals and other factors known to be required for the maximum healthy growth of such animals. The animals thus attained market size sooner and on less feed.

The herein described feed compositions have ben found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency (the number of pounds of feed required to produce a pound gain in weight). Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compounds, the feed with which they are employed and the animal consuming the same. These substances are advantageously combined in such relative proportions with edible carriers to provide pre-mixes or concentrates which may readily be blended with standard nutritionally balanced feeds or which may be used themselves as an adjunct to normal feedings.

In the preparation of concentrates a wide variety of carriers may be employed containing the aforesaid drugs. Suitable carriers include the following: soybean oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances, the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The following examples are provided solely for the purpose of illustration and are not to be construed as limitations of this invention, many variations of which are possible without departing from the spirit or scope thereof.

EXAMPLE I 3-methyl-2-quinoxalinecarboxylic acid, methyl, ester, 1,4-dioxide

To 25 ml. of isopropanol is added 4.08 g. (30 mmoles) of benzofuroxan, 2.32 g. (20 mmoles) of methyl acetoacetate and 70 mg. (1 mmole) of calcium hydroxide, and the resulting mixture heated to 60° C. for 5 hours. The reaction mixture is cooled to 5° C. overnight, and the precipitated product filtered and dried 3.3 g. (70.5% yield), M.P. 168–172.5° C. The product as isolated can be used in subsequent reactions without further purification.

EXAMPLE II

Starting with the appropriate benzofuroxan and acetoacetate, and repeating the procedure of Example I, the following esters of 3-methyl-2- quinoxalinecarboxylic acid, 1,4-dioxide are formed:

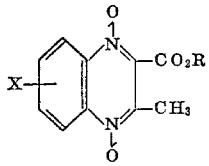

| X (6- or 7-) | R | X (6- or 7-) | R |
|---|---|---|---|
| F | $CH_3$ | Cl | $C_2H_5$ |
| $CF_3$ | $CH_3$ | Cl | $i-C_3H_7$ |
| Cl | $CH_3$ | Cl | $n-C_3H_7$ |
| $OCH_3$ | $CH_3$ | $OCH_3$ | $C_2H_5$ |
| $CH_3$ | $C_2H_5$ | F | $C_2H_5$ |
| $CH_3$ | $t-C_4H_9$ | Br | $C_2H_5$ |
| $CH_3$ | $s-C_4H_9$ | Br | $CH_3$ |
| $CF_3$ | $C_2H_5$ | Br | $i-C_3H_7$ |
| $CF_3$ | $i-C_3H_7$ | Br | $s-C_4H_9$ |
| $CF_3$ | $n-C_4H_9$ | Cl | $n-C_4H_9$ |
| $CF_3$ | $s-C_4H_9$ | H | $C_2H_5$ |
| F | $i-C_3H_7$ | H | $i-C_3H_7$ |
| F | $n-C_3H_7$ | H | $n-C_4H_9$ |
| F | $n-C_4H_9$ | | |

EXAMPLE III

Starting with the same relative amounts of benzofuroxan and methyl acetoacetate as the reagents and isopropanol as the solvent, the general procedure of Example I is repeated employing the indicated reaction time and temperature. The indicated bases are employed in the same molar ratio to the reactants as in Example I; the yields of the product, 3-methyl-2-quinoxalinecarboxylic acid, methyl ester, 1,4-dioxide, using the indicated parameters show the comparative effectiveness of calcium hydroxide (Example I) and are as follows:

| Base employed | Reaction time, hour | Reaction temperature, ° C. | Yield of product, percent |
|---|---|---|---|
| $Ba(OH)_2$ | 2 | 50 | 47 |
| $BaCO_3$ | 18 | 80 | (1) |
| BaO [6] | 2 | 50 | 47 |
| $CaCO_3$ | 18 | 80 | (1) |
| $Mg(OH)_2$ | 4 | 50 | 43 |
| $Al_2O_3$ | 18 | 50 | (2) |
| $Al(i-C_3H_7O)_3$ | 18 | 50 | (1) |
| LiOH | 2 | 50 | 47 |
| $K_2CO_3$ | 2 | 50 | 42 |
| NaOAc [3] | 3 | 50 | 52 |
| TEA [4] | 18 | 50 | (2) |
| DABCO [5] | 18 | 50 | 27 |

[1] Product not present in sufficient amount to crystallize from reaction mixture.
[2] Trace quantity of product evident from thin-layer chromatography, but not isolated.
[3] Sodium acetate.
[4] Triethylamine.
[5] Diazobicyclooctane.
[6] Small amount of water added.

EXAMPLE IV 3-methyl-2-quinoxalinecarboxylic acid, 2-acetoxyethyl ester, 1,4-dioxide To a mixture of 13.6 g. (100 mmoles) and 17.8 ml. (90 mmoles) of 2-acetoxyethyl acetoacetate in 250 ml.

of isopropanol is treated portionwise with 740 mg. (10 mmoles) of calcium hydroxide such that the temperature of the reaction did not rise above 35° C. The reaction mixture is maintained at this temperature for 3 hours, after which it is cooled in a salt-ice bath. The precipitated product is filtered and dried, 17.6 g., M.P. 130–132° C. A second crop of the desired product is obtained by evaporation of the filtrate followed by trituration of the semicrystalline residue with ether, 6.7 g., M.P. 127–130° C. The combined yield amounts to 88.4%.

A small sample is recrystallized for analysis, M.P. 131–133° C.

*Analysis.*—Calcd. for $C_{14}H_{14}O_6N_2$ (percent): C, 54.9; H, 4.6; N, 9.2. Found (percent): C, 54.7; H, 4.7; N, 9.1.

EXAMPLE V

The procedure of Example IV is repeated, employing the appropriate benzofuroxan and acetoacetate, to provide the following congeners:

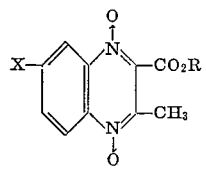

| X (6- or 7-) | R | X (6- or 7-) | R |
|---|---|---|---|
| F | —(CH₂)₂O₂CH | H | —(CH₂)₂O₂CH |
| F | —(CH₂)₂O₂CCH₂CH₃ | H | —(CH₂)₂O₂C(CH₂)₂CH₃ |
| F | —(CH₂)₃O₂CCH₃ | H | —CH(CH₃)CH₂O₂CCH₃ |
| F | —(CH₂)₃O₂CCH(CH₃)₂ | H | —(CH₂)₃O₂CCH₂CH₃ |
| Cl | —(CH₂)₂O₂CCH₃ | CH₃ | —CH(CH₃)CH₂O₂CCH₃ |
| Cl | —CH(CH₃)CH₂O₂C(CH₂)₂CH₃ | CH₃ | —(CH₂)₄O₂CH |
| Cl | —CH(CH₃)CH₂O₂CCH₃ | CH₃ | —(CH₂)₄O₂CCH₃ |
| Cl | —(CH₂)₂O₂CCH₂CH₃ | CH₃ | —CH(CH₃)(CH₂)₂O₂CCH(CH₃)₂ |
| Br | —(CH₂)₄O₂CCH₃ | OCH₃ | —(CH₂)₂O₂CCH₃ |
| Br | —CH(CH₃)(CH₂)₂O₂CCH₃ | OCH₃ | —(CH₂)₂O₂CH |
| Br | —CH₂C(CH₃)₂CH₂O₂CCH₂CH₃ | OCH₃ | —(CH₂)₃O₂CCH₂CH₃ |
| CF₃ | —(CH₂)₂O₂CH | CF₃ | —CH(CH₃)CH₂O₂CCH₃ |
| CF₃ | —(CH₂)₂O₂CCH₃ | CF₃ | —(CH₂)₄O₂CCH₃ |
| CF₃ | —(CH₂)₂O₂C(CH₂)₂CH₃ | | |

EXAMPLE VI

Starting with the same relative proportion of benzofuroxan, 2-acetoxyethyl acetoacetate and isopropanol as in Example IV and employing the indicated reaction temperature and times, the procedure of Example IV is repeated. Various bases, in the same ratio to reactants as in Example IV, substituted for calcium hydroxide for comparative purposes, provided the following yields of 3-methyl-2-quinoxalinecarboxylic acid, 2-acetoxyethyl ester, 1,4-dioxide:

| Base employed | Reaction time, hour | Reaction temperature, ° C. | Yield of product, percent |
|---|---|---|---|
| Ba(OH)₂ | 18 | 35 | 55 |
| BaCO₃ | 18 | 50 | (¹) |
| CaCO₃ | 18 | 50 | (¹) |
| BaO ² | 18 | 80 | 66 |
| Al₂O₃ | 18 | 80 | (¹) |
| LiOH | 18 | 35 | 12 |
| NaOAc³ | 18 | 35 | 26 |
| K₂CO₃ | 18 | 35 | 20 |
| TEA⁴ | 18 | 35 | (¹) |
| DABCO⁵ | 18 | 35 | (¹) |
| Pyrrolidine | 18 | 35 | (¹) |

¹ Trace quantity of product evident from thin-layer chromatography but not isolated.
² Small amount of water added.
³ Sodium acetate.
⁴ Triethylamine.
⁵ Diazobicyclooctane.

EXAMPLE VII 3-methyl-2-quinoxalinecarboxylic acid, 2-hydroxyethyl ester, 1,4-dioxide A solution of 1.0 g. (4.3 mmoles) of 3-methyl-2-quinoxalinecarboxylic acid, methyl ester, 1,4-dioxide and 5 ml. of triethylamine in 50 ml. of ethylene glycol is heated to 60° C. for 4 hours. The reaction mixture is concentrated to half volume, treated with methylene chloride and extracted (2×) with 60 ml. of water. The organic phase is separated, dried over sodium sulfate and concentrated to dryness. Recrystallization of the residual product from chloroform/hexane provides the desired product, 554 mg. (50% yield), M.P. 142–144° C.

*Analysis.*—Calcd. for $C_{12}H_{12}O_5N_2$ (percent): C, 54.5; H, 4.6; N, 10.6. Found (percent): C, 54.2; H, 4.5; N, 10.7.

Similarly, the compounds of Example II are converted to the corresponding 2-hydroxyethyl ester employing the above described procedure.

EXAMPLE VIII

Employing the aforementioned two-fold serial dilution technique, the in vitro activity of some of the products of the instant invention against *Staphylococcus aureus* and *Escherechia coli* are presented. Benzylpenicillin (K salt) when tested gave MIC (minimal inhibitory concentration) values of 0.156 and >100 vs. *S. aureus* and *E. coli*, respectively.

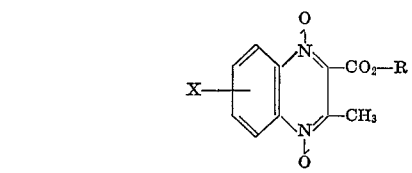

EXAMPLE IX

Using the previously described method for determining in vivo activity, the following compounds were tested orally against *Streptococcus pyogenes* at 200 and 50 mg./kg. and against *Escherecia coli* at 100 and 25 mg./kg., the results being recorded as the percent animals which survived:

| X (6- or 7-) | R | S. aureus | E. coli |
|---|---|---|---|
| H | —(CH₂)₂—O—$\overset{O}{\overset{\|}{C}}$CH₃ | 12.5 | 50 |
| Cl | —(CH₂)₂—O—$\overset{O}{\overset{\|}{C}}$CH₃ | 3.1 | 100 |
| H | CH₃ | 6.25 | 25 |

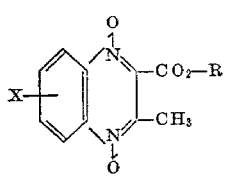

| X (6- or 7-) | R | S. pyogenes | | E. coli | |
|---|---|---|---|---|---|
| | | 200 | 50 | 100 | 25 |
| H | —(CH$_2$)$_2$—O—$\overset{\overset{O}{\|}}{C}$CH$_3$ | 80 | 80 | 100 | 80 |
| Cl | —(CH$_2$)$_2$—O—$\overset{\overset{O}{\|}}{C}$CH$_3$ | 100 | 80 | 60 | |
| H | —(CH$_2$)$_2$—OH | 100 | 60 | 100 | 80 |
| H | CH$_3$ | | | 30 | 0 |

EXAMPLE X

The efficacy of the herein described compounds in protecting against a systemic challenge infection of *Salmonella choleraesuis* var. *kunzendorf* in swine is demonstrated by the following experiment. Young, 6–8 week old pigs are conditioned for fourteen days in isolation rooms and maintained during the entire study on a basal ration consisting of ground yellow corn (78.4%), soybean meal (15%), alfalfa meal (2%), meat bone scraps (2.5%), limestone (0.4%), dicalcium phosphate (0.65%), iodized salt (0.5%), Vitamin pre-mix PPM#5 (0.5%), quadruple delamix (0.05%) and zinc carbonate (7.8 g./100 lbs. mix). All the pigs, which are divided into groups of six, are inoculated on day 0 with 4 ml. (approximately 2.0×10$^8$ organisms) of the stock inoculating suspension. Treatment with the quinoxaline-di-N-oxides of the present invention is carried out on day 0 and day 1 by intromuscular injection at 12 hour intervals at doses of 2.5 and 5 mg./kg. On day 10 the percent mortality in each group is calculated. The following results are obtained:

Medication: Percent mortality
Infected, non-medicated (placebo injection) ____ 83
3 - methyl - 2 - quinoxalinecarboxylic acid, 2-(acetyloxy)ethyl ester, 1,4-dioxide (X=H; R—CH$_2$CH$_2$O$_2$CCH$_3$):
 2.5 mg./kg.×4 _____ 67
 5.0 mg./kg.×4 _____ 17

EXAMPLE XI

Employing the previously described procedure for determining growth promotion in animals, the following quinoxaline-di-N-oxide was tested at 50 g./ton of feed in swine for a period of 28 days and provided the following results:

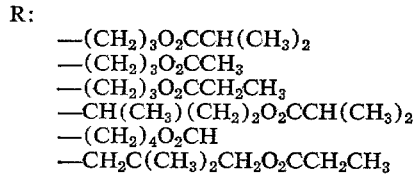

| X | R | Weight gain index* | Percent growth over control |
|---|---|---|---|
| H | —(CH$_2$)$_2$—O—$\overset{\overset{O}{\|}}{C}$CH$_3$ | 153 | 53 |

*Control=100.

PREPARATION A

Acetoacetic acid, alkanoyloxyalkylene esters (a) 2-(acetoyloxy)ethyl acetoacetate: To a stirred solution of 500 g. of 2-hydroxyethyl acetate and 1 ml. of 12 M sulfuric acid is added 403 g. of diketene at such a rate that the reaction mixture temperature is maintained at 85–105° C. When the addition is complete the mixture is heated to 110° C. for 30 minutes, and is then fractionally distilled under reduced pressure, 348 g., B.P. 154–176° C. (18 mm.).

(b) General procedure: To the appropriate alkanoyloxyalkanol containing a catalytic amount of 12 M sulfuric acid is added, approximately, an equimolar amount of diketene at such a rate that the temperature of the resulting exothermic reaction remains at about 80–100° C. The product is isolated by fractional distillation of the reaction mixture under reduced pressure.

The following compounds of the formula

CH$_3$COCH$_2$CO$_2$—R are thus prepared:

R:
—(CH$_2$)$_2$O$_2$CH
—(CH$_2$)$_2$O$_2$CCH$_3$
—(CH$_2$)$_2$O$_2$CCH$_2$CH$_3$
—(CH$_2$)$_2$O$_2$C(CH$_2$)$_2$CH$_3$
—(CH$_2$)$_3$O$_2$CCH$_3$
—(CH$_2$)$_3$O$_2$CCH(CH$_3$)$_2$
—(CH$_2$)$_3$O$_2$CCH$_2$CH$_3$
—CH(CH$_3$)CH$_2$O$_2$CCH$_3$
—CH(CH$_3$)CH$_2$O$_2$C(CH$_2$)$_2$CH$_3$
—CH(CH$_3$)(CH$_2$)$_2$O$_2$CCH$_3$
—CH(CH$_3$)(CH$_2$)$_2$O$_2$CCH(CH$_3$)$_2$
—(CH$_2$)$_4$O$_2$CCH$_3$
—(CH$_2$)$_4$O$_2$CH
—CH$_2$C(CH$_3$)$_2$CH$_2$O$_2$CCH$_2$CH$_3$

PREPARATION B

Alkanoylalkanol

The following acyloxyalkanols not previously reported in the literature are synthesized according to the method of Gibson et al., U.S. Pat. 1,877,847, which comprises heating the known glycol with an appropriate amide in the presence of zinc chloride under reduced pressure until such time as the evolution of ammonia has ceased.

HOR

R:
—(CH$_2$)$_3$O$_2$CCH(CH$_3$)$_2$
—(CH$_2$)$_3$O$_2$CCH$_3$
—(CH$_2$)$_3$O$_2$CCH$_2$CH$_3$
—CH(CH$_3$)(CH$_2$)$_2$O$_2$CCH(CH$_3$)$_2$
—(CH$_2$)$_4$O$_2$CH
—CH$_2$C(CH$_3$)$_2$CH$_2$O$_2$CCH$_2$CH$_3$

What is claimed is:

1. In the process for preparing quinoxaline-di-N-oxides by reacting a benzofuroxan of the formula:

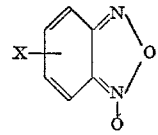

wherein X is a substituent at the 5- or 6-position selected from the group consisting of hydrogen, fluorine, chlorine, bromine, trifluoromethyl, methyl and methoxy, with a β-ketoester of the formula:

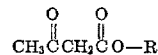

wherein R is selected from the group consisting of alkyl containing from 1 to 4 carbon atoms and substituted alkyl wherein said alkyl contains from 2 to 4 carbon atoms and said substituent is alkanoyloxy said alkanoyl containing from 1 to 4 carbon atoms, the improvement which comprises conducting said reaction in the presence of a catalytic amount of calcium hydroxide, at a temperature of 40–80° C.

2. The process of claim 1 wherein said reaction is carried out in a reaction-inert solvent.

3. The process of claim 2 wherein R is methyl, X is hydrogen and the reaction-inert solvent is isopropanol.

4. The process of claim 2 wherein R is methyl, X is hydrogen and the reaction-inert solvent is chloroform.

5. The process of claim 2 wherein R is acetoxyethyl, X is hydrogen and the reaction-inert solvent is isopropanol.

References Cited
UNITED STATES PATENTS

| | | | |
|---|---|---|---|
| 3,398,141 | 8/1968 | Haddadin et al. | 260—250 R |
| 3,660,398 | 5/1972 | Ley et al. | 260—250 R |

NICHOLAS S. RIZZO, Primary Examiner

U.S. Cl. X.R.

424—250